(12) United States Patent
Crandall

(10) Patent No.: US 7,252,406 B2
(45) Date of Patent: Aug. 7, 2007

(54) FLUORESCENT LAMP SYSTEM USING REFLECTORS

(75) Inventor: Earl F. Crandall, Raleigh, NC (US)

(73) Assignee: Purespectrum LLC, Richmond Hill, GA (US)

( * ) Notice: Subject to any disclaimer, the term of this patent is extended or adjusted under 35 U.S.C. 154(b) by 0 days.

(21) Appl. No.: 10/817,057

(22) Filed: Apr. 2, 2004

(65) Prior Publication Data

US 2004/0195974 A1  Oct. 7, 2004

Related U.S. Application Data

(60) Provisional application No. 60/463,286, filed on Apr. 16, 2003, provisional application No. 60/460,379, filed on Apr. 4, 2003.

(51) Int. Cl.
*F21V 7/00* (2006.01)

(52) U.S. Cl. ........................ 362/247; 362/229

(58) Field of Classification Search ......... 362/227, 362/235, 236, 240, 249, 225, 216–217, 263, 362/84, 257, 347, 247, 260, 229, 243
See application file for complete search history.

(56) References Cited

U.S. PATENT DOCUMENTS

| | | | |
|---|---|---|---|
| 3,681,654 A | | 8/1972 | Quinn |
| 5,285,361 A | * | 2/1994 | McKillip ............... 362/125 |
| 5,377,086 A | * | 12/1994 | Tickner ................ 362/235 |
| 5,615,093 A | | 3/1997 | Nalbant |
| 5,675,677 A | * | 10/1997 | Davenport et al. ....... 385/31 |
| 5,743,628 A | * | 4/1998 | Greif et al. ............ 362/228 |
| 5,782,553 A | * | 7/1998 | McDermott ............. 362/245 |
| 6,170,962 B1 | * | 1/2001 | Wordin ................. 362/247 |
| 6,186,649 B1 | * | 2/2001 | Zou et al. ............. 362/347 |
| 6,318,907 B1 | * | 11/2001 | Schroeder et al. ........ 385/88 |
| 6,652,119 B1 | * | 11/2003 | Barton ................. 362/225 |
| 6,966,684 B2 | * | 11/2005 | Sommers et al. ........ 362/604 |
| 2002/0167264 A1 | * | 11/2002 | Nishio et al. .......... 313/493 |
| 2003/0067790 A1 | * | 4/2003 | Brown et al. .......... 362/565 |

FOREIGN PATENT DOCUMENTS

WO  03/019992 A1  3/2003

* cited by examiner

*Primary Examiner*—Thomas M. Sember
*Assistant Examiner*—Julie A. Shallenberger
(74) *Attorney, Agent, or Firm*—Roylance, Abrams, Berdo & Goodman, L.L.P.

(57) ABSTRACT

A gas discharge lamp includes a plurality of gas discharge bulbs arranged on a base along a perimeter defining a middle region and at least one reflective mirror positioned in the middle region and operative to reflect light outward from the middle region. Alternatively, at least one light pipe can be positioned in the middle region and configured to gather light and redirect the light outward from the middle region.

11 Claims, 6 Drawing Sheets

FLUORESCENT LAMP SYSTEM USING REFLECTORS

RELATED APPLICATIONS

This application claims priority under 37 C.F.R. § 119 to provisional application Ser. Nos. 60/460,379 and 60/463,286, filed on Apr. 4, 2003 and Apr. 16, 2003, respectively, both entitled "Fluorescent Lamp Systems Using Reflectors," both of which are incorporated by reference herein in their entirety.

BACKGROUND

The present invention relates generally to fluorescent lamps. More specifically, this invention relates to fluorescent lamps using reflectors. Additionally, this invention relates to compact fluorescent lamps using reflectors in several configurations.

SUMMARY

In one aspect, a gas discharge lamp includes a plurality of gas discharge bulbs arranged on a base along a perimeter defining a middle region and at least one reflective mirror positioned in the middle region and operative to reflect light outward from the middle region.

Alternatively, at least one light pipe can be positioned in the middle region and configured to gather light and redirect the light outward from the middle region.

BRIEF DESCRIPTION OF THE DRAWINGS

Objects and advantages of the present invention will become apparent to those skilled in the art upon reading this description in conjunction with the accompanying drawings, in which like reference numerals have been used to designate like elements, and in which.

DETAILED DESCRIPTION

Fluorescent light operates by creating a discharge or arc across an ionized gas within a glass tube. The traditional fluorescent—or gas discharge—lamp comprises a tube containing an inert gas and a material such as mercury vapor which, when ionized, can collide with electrons of a current flow across the electrodes of a lamp, and emit photons. These photons strike fluorescent material on the inner wall of the glass tube and produce visible light.

A problem with lamps is the efficiency of the light generation. The present invention contemplates using mirrored reflectors in between an arrangement of lamps to generate more light from smaller wattage lamps.

Figure 1:
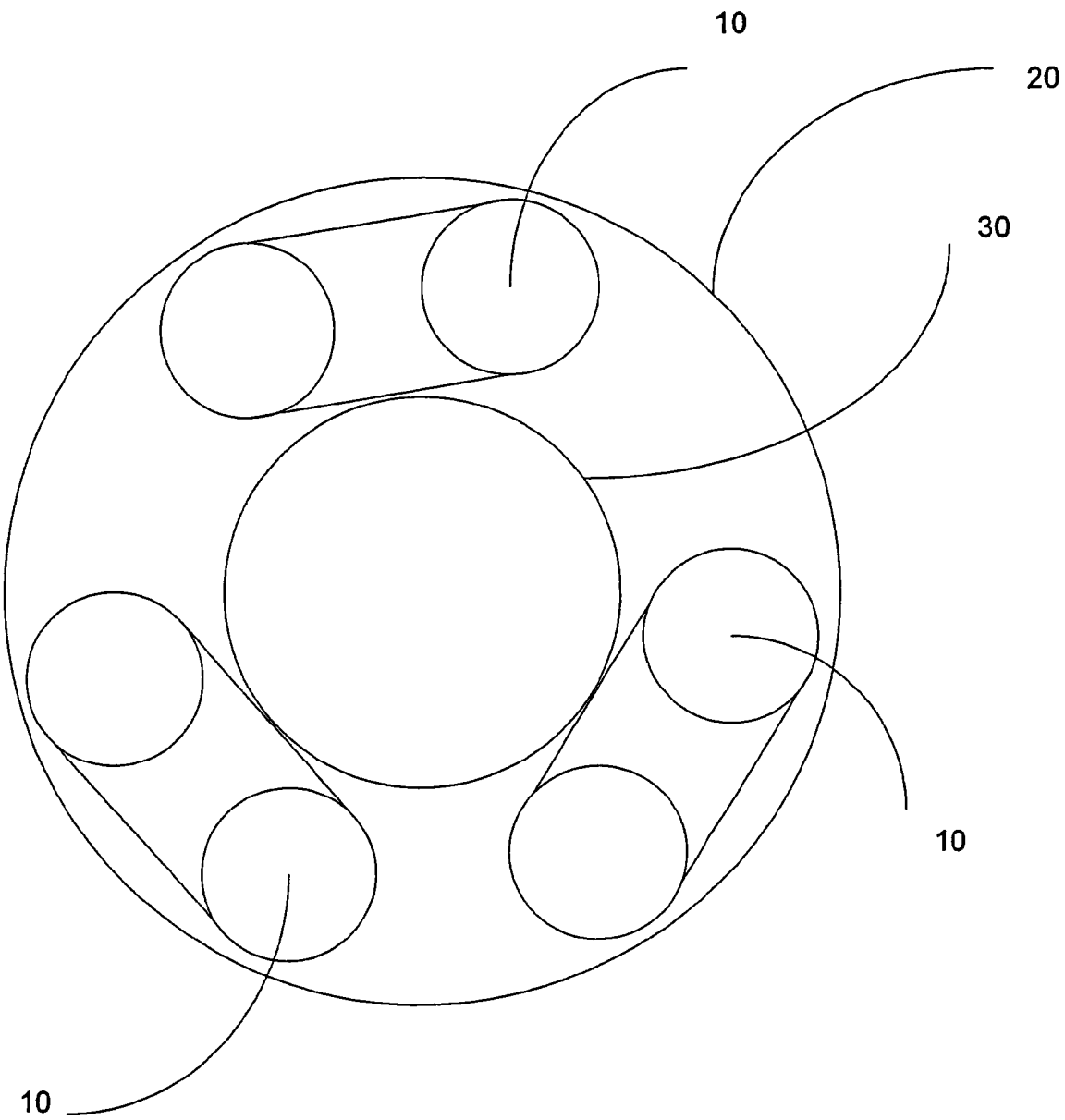
FIG. 1 is a pictorial representation of a top view of a circular arrangement of U-shape bulbs with a circular mirrored reflector according to an embodiment of the present invention.
Figure 1A:
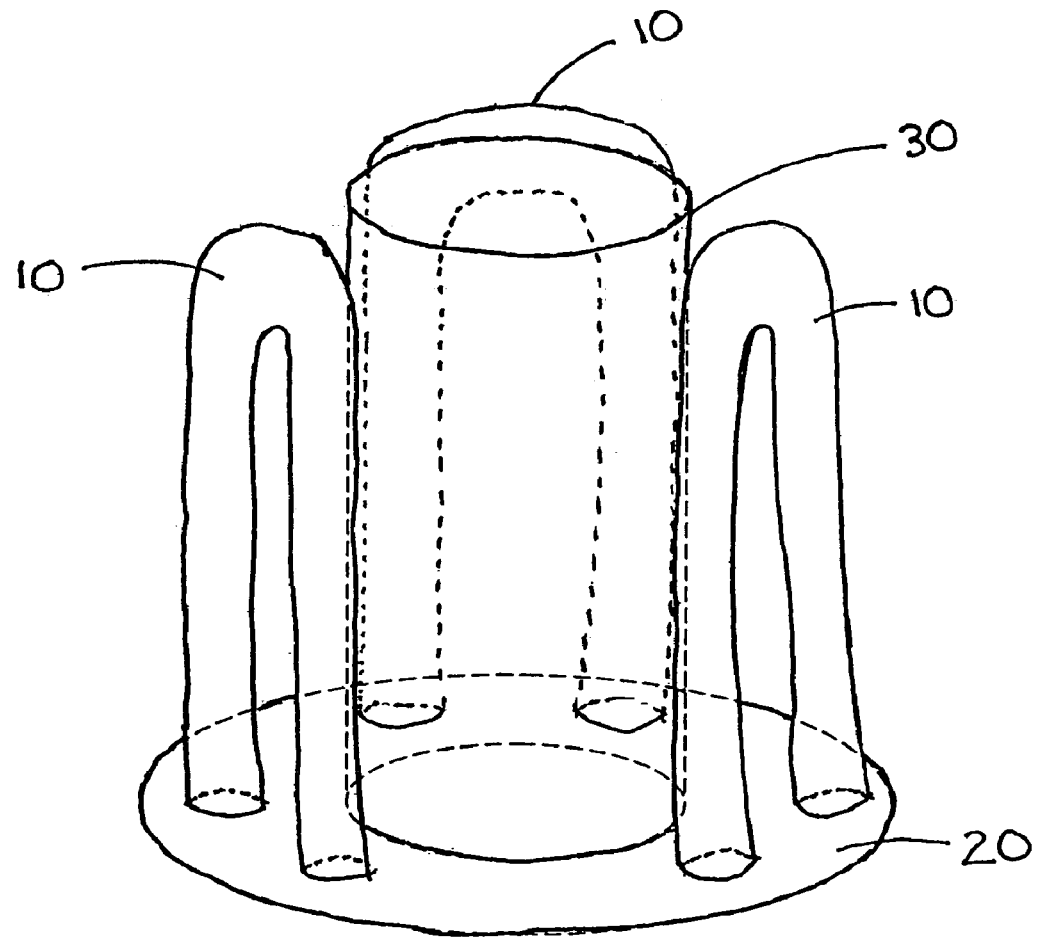
FIG. 1A is a pictorial representation of a sideview of the embodiment of the invention shown in FIG. 1.

FIG. 1 is of a top view of a circular arrangement of U-shape bulbs 10 with a circular mirrored reflector 30 according to an embodiment of the present invention. In this embodiment, the U-shaped bulbs 10 may be compact florescent bulbs or any other type of lamp designed in a compact configuration. A circle of U shaped tubes or a spiral lamp design may be used in accordance with the invention. According to a particular embodiment, U-shaped bulbs 10 are in a curricular arrangement on a base 30 with a circular reflective mirror 30 in the middle. This arrangement allows a maximum amount of light to be reflected from the interior to the outside.

The arrangement of the bulbs need not be circular, but can be along any perimeter that defines a middle region for placing a reflective material. The bulbs need not be U-shaped, but can be any shape.

The circular mirror 30 may be replaced with a mirror or any shape which efficiently reflects light from the U-shaped bulbs 10 outward. The U-shaped bulbs 10 may be arranged in any geometric shape capable of surrounding an inner mirrored reflector. FIG. 1 shows three U-shaped bulbs, however any number of bulbs greater than one may be used according the invention.

Figure 2A:
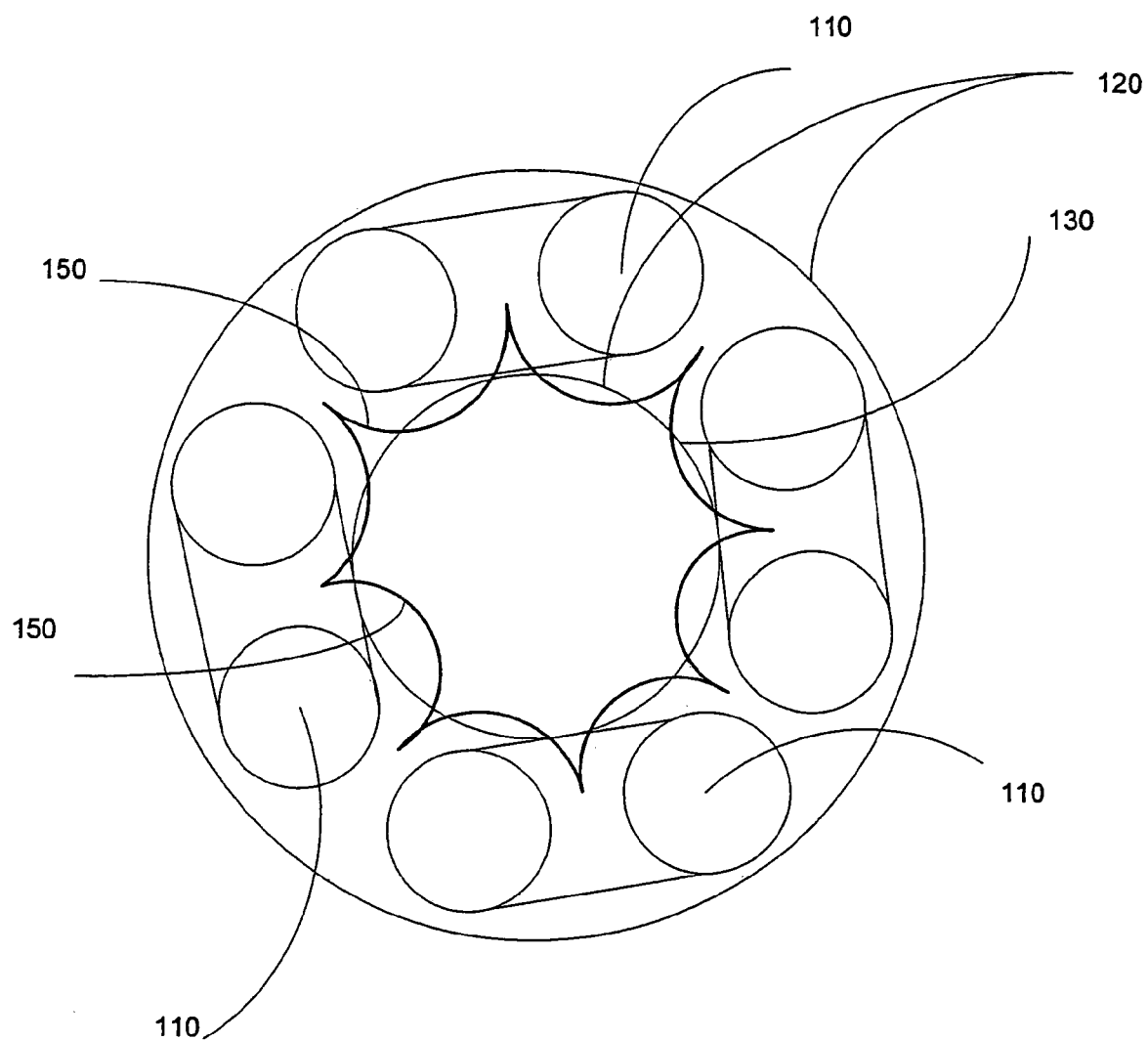
FIG. 2A is a pictorial representation of a top view of a circular arrangement of U-shape bulbs with hyperbolic mirrored reflectors according to an embodiment of the present invention.

FIG. 2A is a pictorial representation of a top view of a circular arrangement of U-shape bulbs 110 with a series of hyperbolic mirrored reflectors 150 according to an embodiment of the present invention. In this exemplary embodiment, the U-shaped bulbs 110 may be compact florescent bulbs or any other type of lamp designed in a compact configuration. In this embodiment, the U-shaped bulbs 110 are attached to a base 120. The U-shaped bulbs 110 are in a circular arrangement. The reflectors 150 are hyperbolic, and paired together to individually reflect light from each arm of the U-shaped bulbs 110. This arrangement increases the light reflected outward. FIG. 2 shows four U-shaped bulbs, however any number of bulbs 110 greater than one may be used according the invention.

Figure 2B:
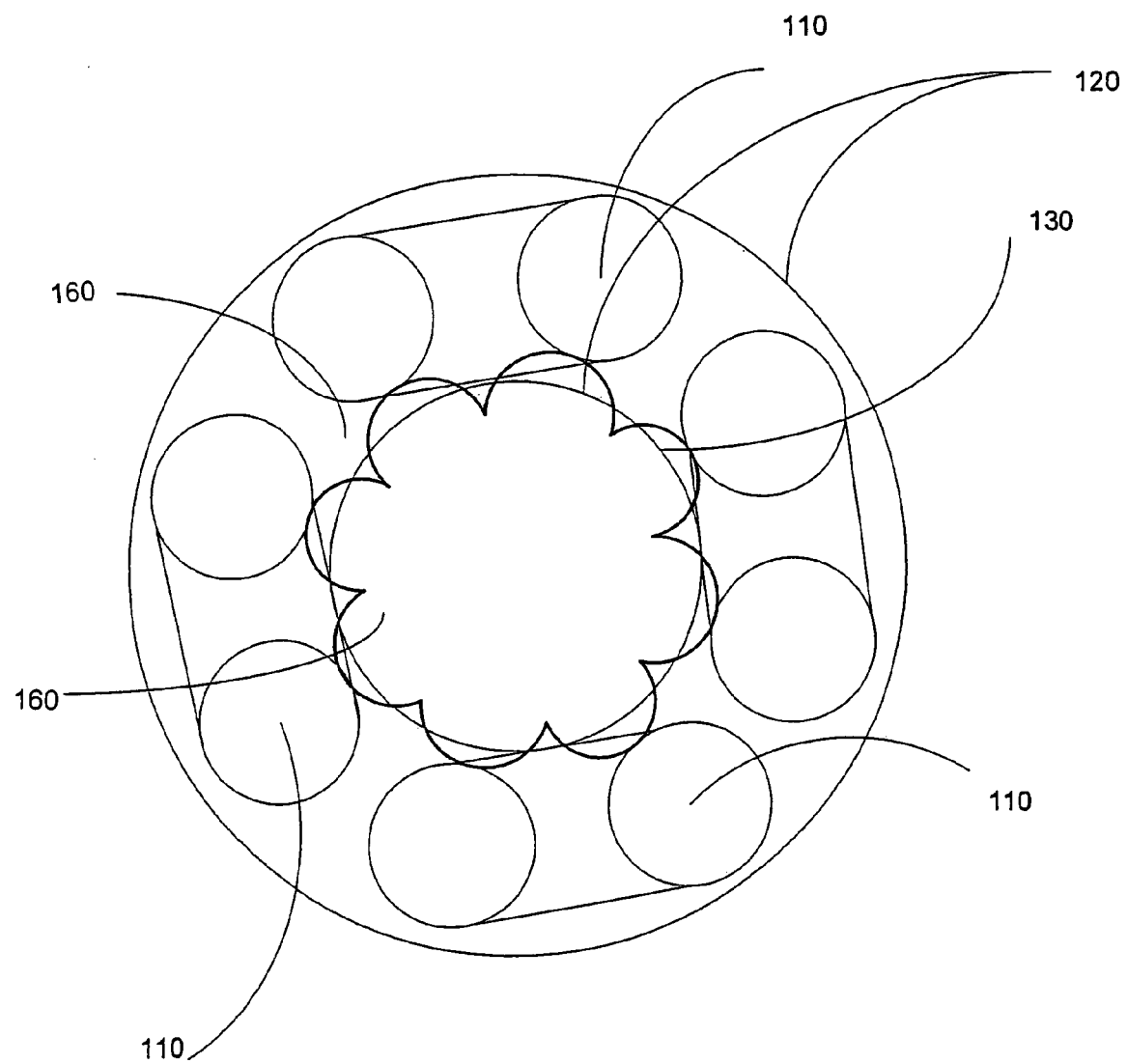
FIG. 2B is a pictorial representation of a top view of a circular arrangement of U-shape bulbs with parabolic mirrored reflectors according to an embodiment of the present invention.

FIG. 2B is a pictorial representation of a top view of a circular arrangement of U-shape bulbs 110 with a series of parabolic mirrored reflectors 160 according to an embodiment of the present invention. Again, the U-shaped bulbs 110 may be compact fluorescent bulbs or any other type of lamp designed in a compact configuration and are attached to a base 120 in a circular arrangement. In this embodiment, however, the reflectors 160 are parabolic, and paired together to individually reflect light from each arm of the U-shaped bulbs 110. This arrangement increases the light reflected outward. Any number of bulbs 110 greater than one may be used according the invention.

Figure 3:
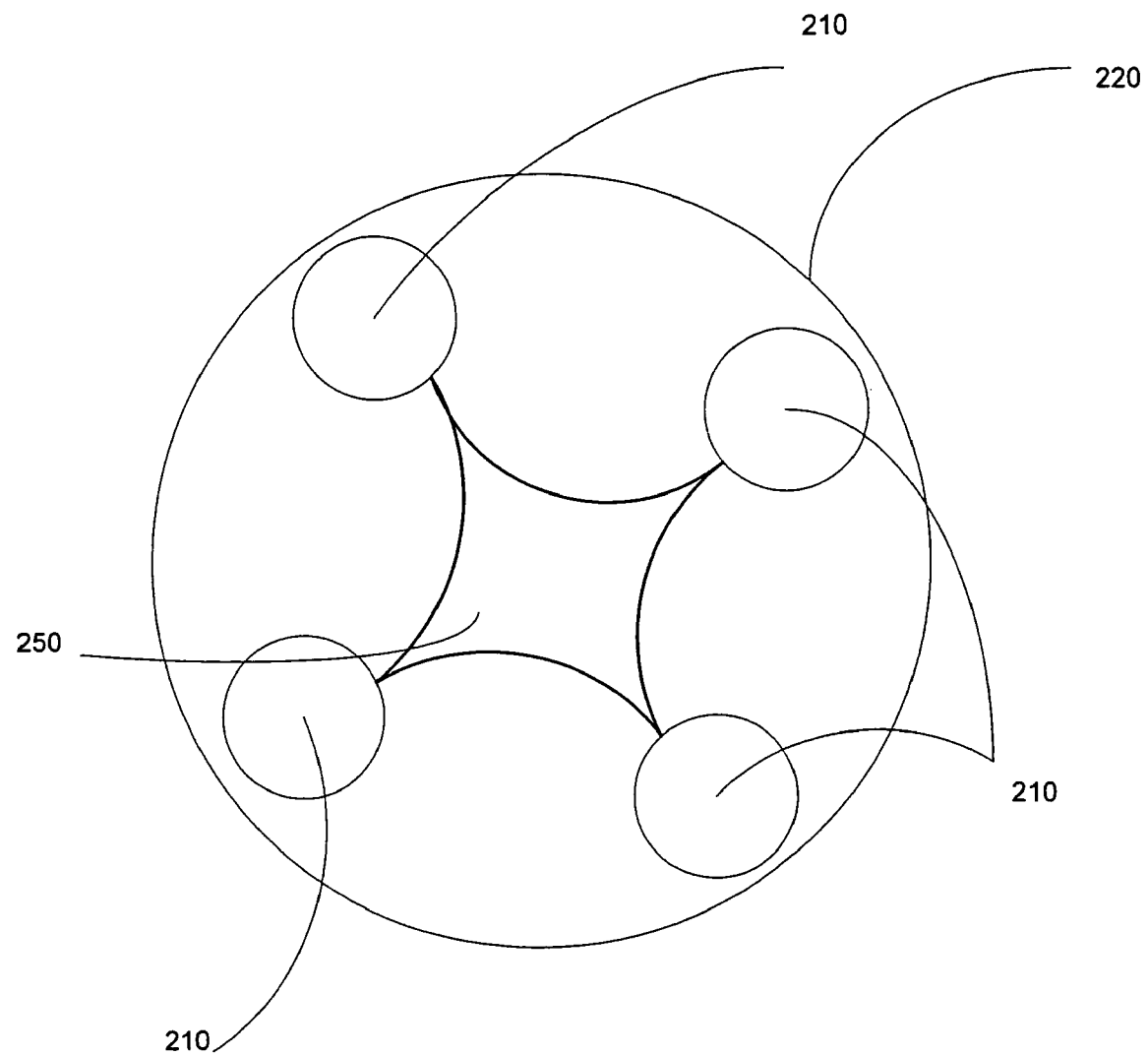
FIG. 3 is a pictorial representation of a top view of a circular arrangement of bulbs with parabolic mirrored reflectors according to an embodiment of the present invention.

FIG. 3 is a pictorial representation of a top view of a circular arrangement of bulbs 210 with parabolic mirrored reflectors 250 according to an embodiment of the present invention. The reflectors 250 may be light pipes or other reflecting techniques known by those skilled in the art. In this exemplary embodiment, the U-shaped bulbs 210 may be compact florescent bulbs or any other type of lamp designed in a compact configuration of multiple light sources from one or more lamps. In this embodiment, the U-shaped bulbs 210 are attached to a base 220. The U-shaped bulbs 110 are in a circular arrangement. The reflectors 250 are parabolic, and arranged so that each end of each reflector 250 is near the point on the inner side of bulbs 210 that faces the center of the circular arrangement of bulbs. This arrangement increases the light reflected outward. For example, each reflector 250, according to this embodiment reflects approximately half the light from each of two of the bulbs 210. FIG. 3 shows four U-shaped bulbs 210, however any number of bulbs greater than one may be used according the invention.

Reflective materials in various shapes, from a simple cylinder to multiple parabolic shapes may be employed to increase the efficiency of gas discharge lamps. In the above examples, compact fluorescent lamps have been shown, but any gas discharge light source may be used, as will be appreciated by those having skill in this art.

Figure 4:
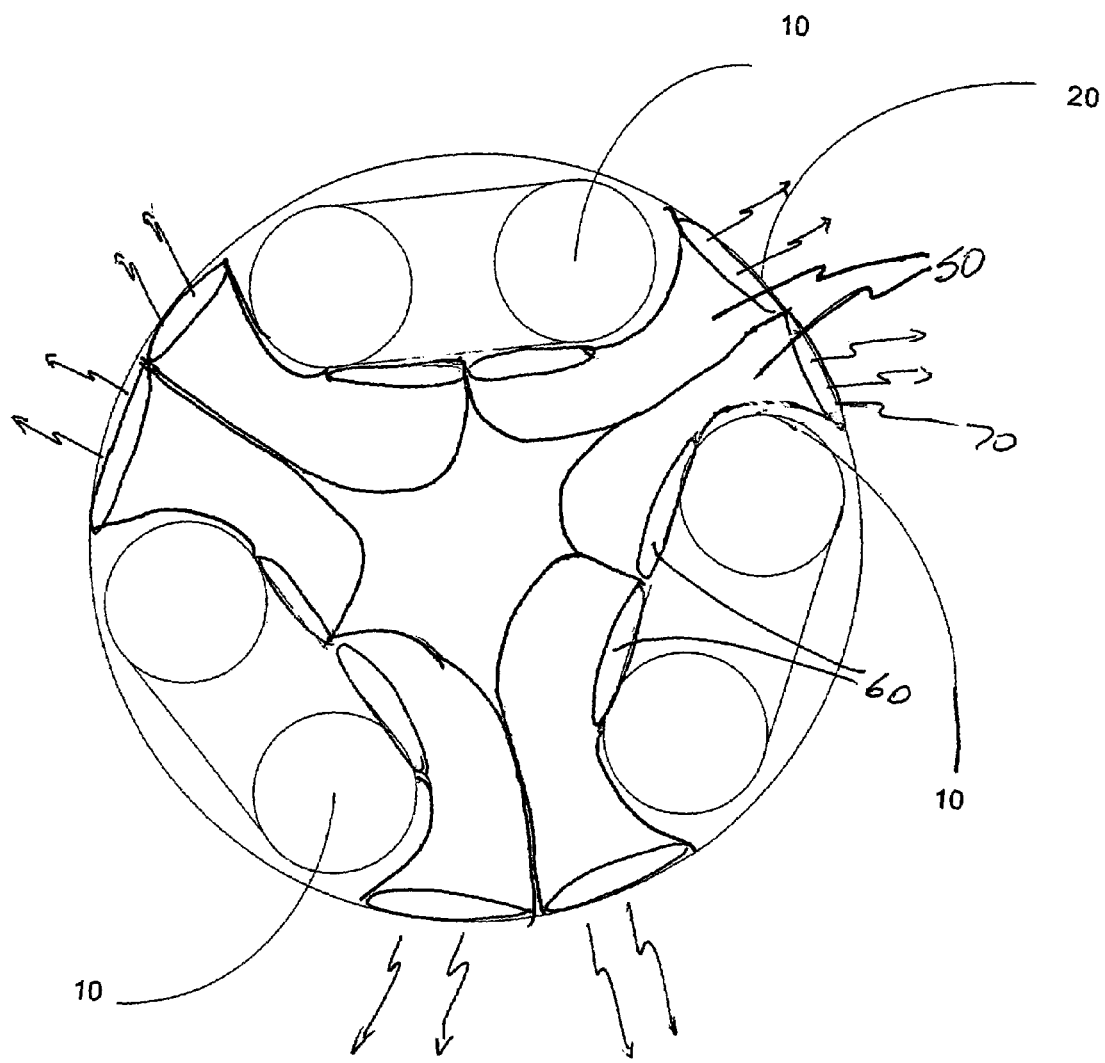
FIG. 4 is a pictorial representation of a top view of a circular arrangement of U-shape bulbs with light pipes according to an embodiment of the present invention.

In addition to reflectors, "light pipes" may be employed as well from the back of each light collecting light and bringing it out between the lamps. Light pipes can be in vertical strips or of any shape to effect the desired result. For example, as shown in FIG. 4, according to an aspect of the invention, light pipes 50 are used to gather light at a rear portion of the bulbs and to carry light to the outward from the lamp. In FIG. 4, the lamp includes more than one bulb positioned such that there is a middle region inside the group of bulbs. One end 60 of the light pipe or pipes 50 is positioned to receive light from the portion of a bulb that is facing toward the middle region of a group of bulbs. The other end 70 of the pipe or pipes 50 is position so that the light coming out of that end of the pipe is directed outside of the group of bulbs. In the embodiment illustrated, the light pipes 50 split the light form the rear of one prong of the U-shaped lamp into two paths that lead the light out of the lamp system on either side of the one prong of lamp. This can be accomplished with one light pipe as well. Other arrangements that guide light from the inside to the outside of the lamps may be used in accordance with the invention.

The light pipe 50 may be formed of a solid piece of molded glass or may be a bundle of smaller fibers. The material of the pipe may be glass or plastic. Those skilled in the art will know of other materials suitable to carry light in accordance with the present invention. The material may also be solid or semi-flexible. A flexible material may be used that becomes solid or more solid with the application of heat or over a period of time. The pipe may be linear or curvilinear. In this particular embodiment the light pipe is molded to fit the curvature of the tube. The light pipe may also be coated with a metalized layer to reflect light within the pipe and guide the light from one end to the other end of the pipe. The lamp may be U-shaped. The lamp may also be spiral shaped or other geometric shape that is desired.

It will be appreciated by those of ordinary skill in the art that the invention can be embodied in various specific forms without departing from its essential characteristics. The disclosed embodiments are considered in all respects to be illustrative and not restrictive. The scope of the invention is indicated by the appended claims, rather than the foregoing description, and all changes that come within the meaning and range of equivalents thereof are intended to be embraced thereby.

It should be emphasized that the terms "comprises", "comprising", "includes", and "including", when used in this description and claims, are taken to specify the presence of stated features, steps, or components, but the use of these terms does not preclude the presence or addition of one or more other features, steps, components, or groups thereof.

What is claimed is:

1. A gas discharge lamp, comprising:
   a plurality of gas discharge bulbs arranged on a base along a perimeter defining a middle region; and
   at least one reflective mirror positioned in the middle region and operative to reflect light generated by each of said gas discharge bulbs outward from the middle region,
   wherein the at least one reflective mirror is hyperbolic in shape.

2. The gas discharge lamp of claim 1, wherein the bulbs are U-shaped.

3. The gas discharge lamp of claim 1, wherein hyperbolic mirrored reflectors are paired together to individually reflect light from each arm of U-shaped bulbs.

4. A gas discharge lamp, comprising:
   a plurality of gas discharge bulbs arranged on a base along a perimeter defining a middle region; and
   at least one reflective mirror positioned in the middle region and operative to reflect light generated by each of said gas discharge bulbs outward from the middle region, wherein the at least one reflective mirror is parabolic in shape.

5. The gas discharge lamp of claim 4, wherein parabolic mirrored reflectors are paired together to individually reflect light from each arm of U-shaped bulbs.

6. The gas discharge lamp of claim 4, wherein each end of each parabolic mirrored reflector is near a point on an inner side of a respective bulb that is closest to the center of a circular arrangement of bulbs.

7. A gas discharge lamp, comprising:
   a plurality of gas discharge bulbs arranged on a base along a perimeter defining a middle region; and
   at least one light pipe positioned in the middle region and configured to gather light generated by said gas discharge bulbs and redirect the gathered light outward from the middle region,
   wherein the at least one light pipe is formed of a bundle of smaller fibers.

8. A gas discharge lamp, comprising:
   a plurality of gas discharge bulbs arranged on a base along a perimeter defining a middle region; and
   at least one light pipe positioned in the middle region and configured to gather light generated by said gas discharge bulbs and redirect the gathered light outward from the middle region,
   wherein the bulbs are U-shaped and the at least one light pipe is arranged to gather light from a rear of one prong of a U-shaped bulb and redirect the light out of the lamp.

9. A gas discharge lamp, comprising:
   a plurality of gas discharge bulbs arranged on a base along a perimeter defining a middle region; and
   at least one light pipe positioned in the middle region and configured to gather light generated by said gas discharge bulbs and redirect the gathered light outward from the middle region,
   wherein the at least one light pipe is coated with a metalized layer to reflect light within the pipe and guide the light from one end to another end of the pipe.

10. The gas discharge lamp of claim 7, wherein the bulbs are arranged in a circular perimeter.

11. The gas discharge lamp of claim 7, wherein the bulbs are U-shaped.

* * * * *